June 30, 1970  A. M. FAULKNER  3,517,804
JOINTING CLIPS FOR INSULATED ELECTRIC WIRES
AND METHOD OF MAKING SAME
Filed May 28, 1968  3 Sheets-Sheet 1

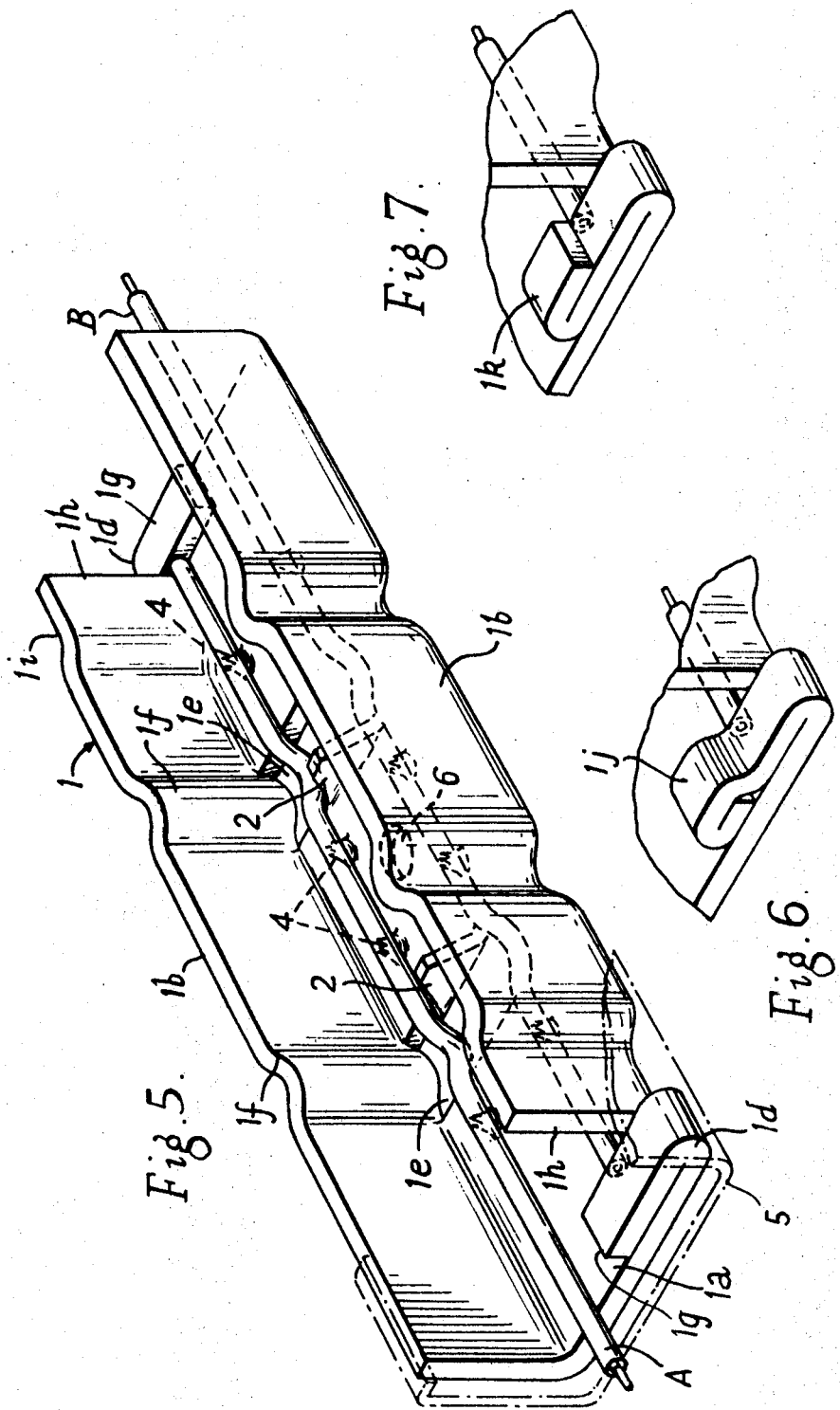

United States Patent Office 3,517,804
Patented June 30, 1970

3,517,804
JOINTING CLIPS FOR INSULATED ELECTRIC WIRES AND METHOD OF MAKING SAME
Arthur Manthorp Faulkner, Ilford, England, assignor to The Plessey Company Limited, Ilford, England, a British company
Filed May 28, 1968, Ser. No. 732,602
Claims priority, application Great Britain, June 7, 1967, 26,267/67; June 8, 1967, 26,492/67
Int. Cl. H02g 15/08; B65d 83/00
U.S. Cl. 206—56                                        12 Claims

ABSTRACT OF THE DISCLOSURE

U-profiled insulation-piercing wire-jointing clips for use in quick action applicators are externally insulated and at the same time longitudinally joined to each other by being inserted end to end into a continuous extruded channel of rigid polyvinylchloride of which the two flanges have inwardly projecting secondary flanges for retention of the clips, longitudinal spacing of the clips in the channel being ensured by alignment of location holes in the web of each clip with suitably spaced location holes in the insulation channel. Flexibility of the composite strip is achieved by pre-separating the flanges of adjacent lengths of the insulating channel, leaving only its web coherent. Automatic trimming of the free wire ends is effected by an anvil which is formed at the end of the channel by bending over a strip of the sidewall, and which co-operates in guillotine fashion with the edge-like end of the remainder of the sidewall. The channel bottom has windows co-operating with ridges of the channel sidewalls and the sidewalls are placed under high compressive stress during the folding-over operation.

---

Figure 1:
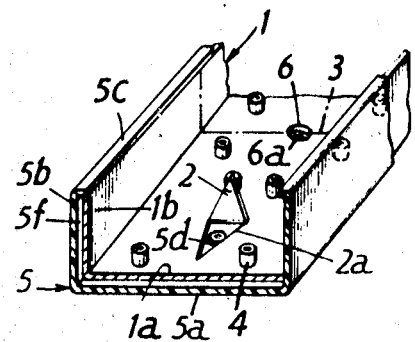

This invention relates to the jointing of electric wires and has for an object to provide an improved flexible strip of channel-type insulated jointing clips each adapted to form, when applied to a pair of adjacently placed ends of insulated electric wires, an electrically conductive joint between the conductors of the wires in which all conductive surfaces are protected by insulating material, and is more particularly, though not exclusively, applicable to clips of the kind referred to which are formed with insulation-piercing edge portions which, when the clip is crimped with two insulated wires placed into it, will establish electrical connection between the conductive cores of the wires without requiring the wires to be stripped of insulation.

The present invention has for an object to provide a continuous channel of flexible insulating material in which a plurality of individual metal jointing clips are secured, independently of any adhesive, so as to be spaced from each other in the longitudinal direction of the channel, two of the three channel walls, preferably the two flanges of the channel, being divided at a point intermediate each pair of adjacent ends of consecutive clips so as to ensure the formation between such ends of a flexible connection constituted by a flat continuous channel wall.

According to one aspect of the present invention the insulation is provided in the form of a preferably extruded profiled channel of rigid polyvinyl-chloride or other insulating material showing a similar combination of resilience and malleability, the two flanges of the channel being provided at their free edges with inwardly projecting clip-retaining portions, this insulating channel being so dimensioned as to embrace the profile of the channel-type metal clip substantially without play with the clip-retaining portions of the insulating channel operative to retain the metal clip at the bottom of the insulating channel. The length of insulating channel attached to each insulated clip after sub-division of the channel is slightly in excess of that of the metal clip, and the latter is so placed in the associated section of the insulating channel that the two ends of the metal clip are spaced respectively from the two ends of the insulating channel section. After its insertion each metal clip is secured against longitudinal displacement relative to its associated section of the insulating channel by stagging portions of the latter into suitable apertures or recesses of the metal clip.

In practice when the two wires to be connected are inserted into the clip, they will usually overlap considerably more than by the length which is required for effecting the connection by means of the clip. It is therefore normally necessary when the wires extend through the clip from opposite ends, to remove by trimming the excess of each wire beyond the clip while ensuring that the cut-off end of each wire terminates short of the end of the insulation surrounding the clip so as to ensure that the metal core of the trimmed wire end is not liable to accidental contact. The present invention in one of its aspects provides an improved insulated wire clip which when folded or crimped to interconnect two wire ends projecting through it from opposite ends of the clip, will automatically trim the free end of each wire short of the end of the insulation of the clip.

According to this aspect of the present invention a channel-type insulated wire-jointing clip especially one having internal projections arranged to bite through the insulation and engage the conductor core of the insulated wires when the flanges of the channel are folded to form the joint, is formed at each end of the web or base of the channel with a raised anvil forming a cutting edge proud of the bottom of the inside of the channel bottom, the anvils at the two ends being arranged at opposite sides of the longitudinal centre line of the channel, and in each case the adjacent sidewall of the channel is shortened to form a complementary cutting edge co-operating with said cutting edge of the anvil, to trim off the end of a wire resting on said anvil when the sidewall is folded down in order to secure a wire and make contact with its conducting core. It will be readily appreciated that this construction of the metal clip ensures that the trimmed end of each wire will be well within the length of the metal clip and will therefore be protected by the insulation of the latter, especially when, as in the case of the whole profile of the insulating channel projects beyond the two ends of the bottom of the metal clip, and the end portions of the sidewalls or flanges of the insulating channel will therefore, after the crimping operation, overlie that portion of the metal clip in which each trimmed wire end is accommodated.

Preferably in a flexible strip of jointing clips each section of the insulating channel and its associated metal clip are provided in its web portion with a locating hole so arranged that the locating holes of the two are in mutual alignment when the clip is in its correct longitudinal position relative to the insulating channel. A plurality of clips according to the present invention may thus be combined to form a readily flexible strip by providing a suitable length of extruded insulating channel with suitably spaced locating holes in its web portion while its flanges are sub-divided by incisions perpendicular to the plane of the web and to the longitudinal direction of the channel, spaced in accordance with the desired length of the insulating channel of each clip while the web portion is left integral to preserve continuity, whereafter each length of this flexible channel is loaded with an associated metal clip by insertion of the metal clip in a direction at right angles to the web between the two flanges, the two flanges being then arranged to return by their own resilience or by mechanical pressure to their original form, thus causing the secondary flanges to trap the metal clip against withdrawal in a direction opposite to that of their insertion and the metal clips being secured against longitudinal displacement by stagging part of the material of a channel wall into suitable apertures in the corresponding wall of the metal clip. The strip in its preferred form will thus consist of complete insulated jointing clips according to the invention integrally joined only by the web portions of their insulating channels with adjacent metal clips spaced from each other by at least twice the length of the desired overhang of the insulating sleeve. The resultant strip of jointing clips is highly flexible towards the backs of the clips and can be readily separated into individual clips by merely severing with a razor-edge knife or cropping the back of the insulating channel is continuation of two incisions in its flanges.

Although this form of flexible strip will be generally preferred, the invention also includes the alternative form of flexble strip in which the incisions are arranged to sub-divide the web and one flange of the channel and generally also the secondary flange of the second flange, while the remainder of the second flange ensures the flexible continuity of the strip.

According to a further optional feature of the invention the completed strip may be supplied in the form of spiral coils accommodated in cassettes, for example of suitable plastics material, which may be disposable and a cassette loaded with such strip constitutes another aspect of the present invention, while yet another aspect is constituted by the insulating channel having secondary flanges with the two flanges, or one flange and the web, sub-divided into individual lengths, each length of the insulating channel having a location hole at a predetermined portion of its web.

In order that the invention may be more readily understood, reference will now be made to the accompanying drawing, in which, FIG. 1 is a perspective view showing a single section of one form of flexible strip constructed in accordance with the invention, constituting an insulated jointing clip with part of the clip shown broken away.

Figure 2:
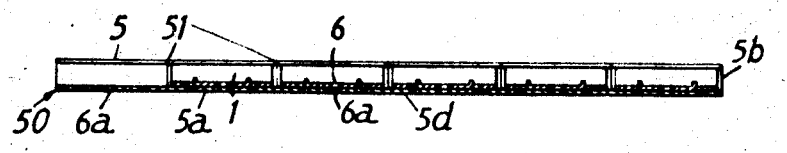
Figure 3:
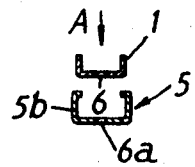
Figure 4:
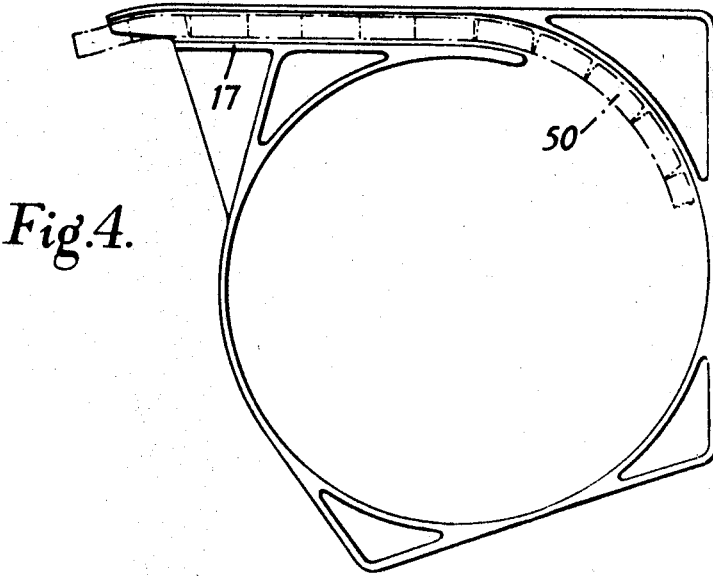
Figure 8:
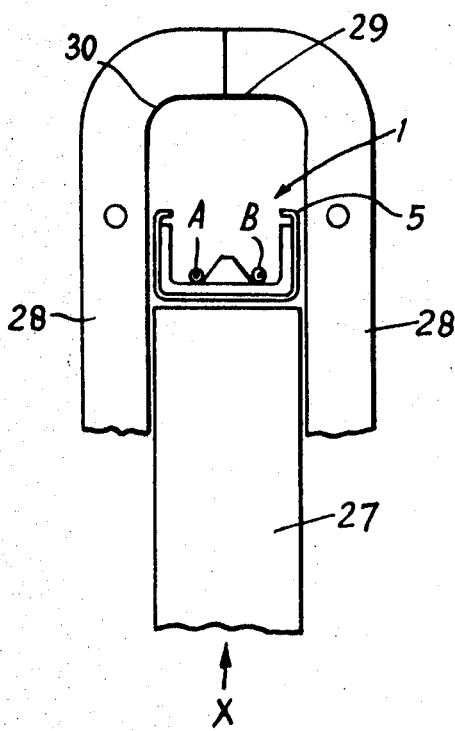
Figure 9:
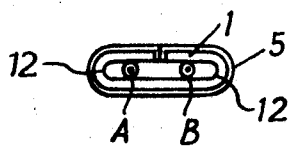

FIG. 2 is a sectional side elevation of a continuous flexible strip of clips made in accordance with the present invention, FIG. 3 is an exploded cross-section thereof showing the plastic channel and the metal clip, with the direction of insertion of the latter into the former indicated by an arrow, FIG. 4 is a side elevation of a spiral magazine charged with a flexible strip of connector clips in accordance with the present invention, one end plate of the magazine being removed, FIG. 5 is a perspective view of a channel-type metal clip forming part of a connector clip according to the present invention, prior to the crimping operation, with a pair of wires shown in position at the bottom of the channel in the form which they will assume when the crimping operation has been completed, and with part of the insulating channel indicated in chain-dotted lines, FIGS. 6 and 7 show modifications of the end of the metal clip having alternative forms of anvil, and FIGS. 8 and 9 illustrate a preferred form of crimping operation, FIG. 8 being an end elevation of the crimping dies with a clip in position, and FIG. 9 being an end elevation of a completed joint.

Referring now first to FIG. 1, the illustrated strip comprises a clip constituted by a thin-walled channel 1 of suitably deformable metal, for example Phosphor bronze or half-hard brass, having a bottom or web portion 1a and two side walls or flanges 1b. The length of the clip substantially corresponds to that length of each wire which is to be employed to form the joint. The web 1a of the channel is sub-divided in its width by two triangular tabs 2 spaced along its longitudinal plane of symmetry and provided with a number of mutually staggered sharp-edged excrescences 4. Only one of the tabs 2 is shown; the second one is arranged at the opposite side of a transverse plane of symmetry indicated by a chain-dotted line 3. When using the clip to join two insulated wires, the two wires to be joined are respectively placed unstripped into the channels at the two sides of the tabs 2, and a suitable tool is then applied to fold-over the two channel side walls 1b towards the centre of the channel and to press them down on to the wires so as to hold each wire firmly in position. That application operation will at the same time force the excrescences 4 of the channel bottom through the insulation of the wires into intimate contact with the metal core of each wire.

When the above-described metal clip has been formed and suitably plated, it is covered on its outer side with suitably flexible insulating material by inserting the metal clip into an extruded length or section of channel 5, made of rigid polyvinyl chloride or other suitable insulating material, having a similar combination of resilience and malleability, whose flanges 5b are formed at their free edges with inwardly projecting secondary flanges 5c. These secondary flanges, which constitute clip-retaining portions, are arranged to co-operate with the free edges of the side walls or flanges 1b of the metal clip to retain the latter inside the insulating channel 5, and the height of the flanges or sidewalls 1b of the metal channel 1 is so chosen that the secondary flanges 5c of the insulating channel 5 will approximately meet when the application operation has been completed. The metal clip 1 is inserted into an insulating-channel length 5 which is somewhat longer than the metal clip, the insertion being preferably effected by movement at right angles to the web or bottom 5a, and in order to ensure proper longitudinal positioning of the metal clip with the two end portions of the insulating channel section projecting beyond both ends of the metal clip as shown at 5f, the bottom portions 1a of each metal clip and of each channel length or section are further provided with aligned central perforations 6 and 6a respectively. After its application to the metal clip, the insulating channel length 5 is retained in its longitudinal position relative to the metal clip by depressing or stagging portions 5d of the channel bottom 5a to project into apertures 2a which are formed in the bottom 1a of the metal clip 1 by the deflection of the tabs 2.

FIG. 2 shows a flexible strip 50 according to the invention comprising a plurality of sections each constituting an insulated jointing clip, the insulating channel sections 5 of the clips being integrally joined by their web portions 5a while their sidewalls or flanges 5b are separated from each other by razor cuts 51 extending from the free edges of the flanges to end just short of the web portion 5a, and each channel section 5 is, prior to the insertion of the metal clips 1, provided with a locating aperture 6a. Each section 5 is then loaded with a metal clip 1, which is introduced from the open side of the channel 5 as indicated by the arrow A in FIG. 3, with the hole 6 of the clip aligned with the hole 6a of the associated channel section, so that the two ends of the clip are evenly spaced from the incisions 51 that terminate the individual sections of the insulating channel 5. When thus positioned in an insulating channel section, the metal clip 1 is secured against longitudinal displacement by applying to the outer side of the web of the insulating channel 5a a stagging tool to force portions of its material into one of the apertures 2a of the web portion 1a of the metal clip. A strip 50 is thus obtained of individual clips which are joined only by the flat back or web portion of the insulating channel. The strip 50 is therefore readily flexible towards its back so that it can be loaded in spiral form into a small-diameter cassette, as illustrated in FIG. 4. This figure shows a disposable plastic cassette 7, into which a strip may be loaded by being pushed in through the exit channel 17. Alternatively the strip may be wound first to form a suitable spiral with the outer end of the strip extending tangentially from the spiral, and may then be placed into the cassette axially, whereafter the cassette is closed by the application of a suitable lid or flat end cover, which may be removable or permanently secured.

Referring now to FIG. 5, a metal clip 1, which is shown to a greatly enlarged scale, and may in practice, for use with normal telephone wires, have a length of between 5/8" and 11/16", has a general channel profile and may be made from profile-rolled, or profile-drawn metal or blanked from a sheet metal. The material may in either case be, for example, Prosphor bronze or half-hard brass. Two triangular tabs 2 are longitudinally spaced along the centre line of the channel bottom or web 1a to determine two laterally adjacent part-channels for two insulated wires A, B which are to be connected, and in each part-channel the web 1a is formed with sharp-edged protuberances 4 which serve to pierce the insulation of each wire. The metal clip 1 is accommodated in a length 5 of extruded channel of insulating material, for example of rigid polyvinyl chloride, which projects beyond the two ends of the metal clip 1 to protect the end surfaces of the metal clip 1 from accidental conductive contact. At its centre the bottom or web 1a of the clip is formed with a positioning hole 6, which assists in ensuring the correct longitudinal position of the clip 1 in the insulating channel 5 in a manner more fully described hereinabove, and it will be appreciated that when the side flanges 1b of the channel-profiled metal clip 1 are folded onto the channel bottom 1a during a wire-jointing operation, the wires will be forced onto the projections 4, which will bite through the insulation of the wire and establish contact with the metal core of the wire.

There would however be a certain risk that at the end of the crimping operation residual resilience would cause the bent-over channel sidewalls to move back sufficiently to remove the contact pressure between the projections 4 and the wire core, and in order to prevent resultant unreliability of the joint formed by means of the clip, the bottom 1a of the channel is preferably formed with two longitudinally spaced transverse depressions or cut-out windows 1e and the inner faces of the side walls 1b with complementary projecting ridges 1f. With this construction, the bending over of the channel side walls during the jointing operation, in addition to forcing the wires onto the spikes 4 by direct pressure of the side walls, will also deform each wire into a curved shape at two longitudinally spaced points to match the projecting ridges 1f, thereby resiliently stretching the portion of the wire lying between the deformed portions, where it forms a catenary between the ridges 1f of the side wall 1b tending to press the wire downwardly, this catenary being deflected by the opposite action of the spike portions 4, which are thus held in resilient contact with the core of the wire, even after a certain amount of resilient return movement of the channel side walls. In addition as the wire is deflected by each ridge if it is, under tension, urged against the front and rear edges of the windows 1e so that these edges will bite through the wire insulation and into the core of the wire with which they will be held tensionally in contact, thereby assisting in ensuring electrical contact in the joint as well as in maintaining the mechanical tension in the wires in and between the windows 1e.

It will further be seen that at opposite ends respectively of the two side walls or flanges 1b of the metal clip 1 a short length 1e of each side wall is separated to form a strip, which is bent-over on to the bottom or web 1a of the metal channel 1 during the formation of the metal clip. This bent-over strip forms a sharp-edged anvil 1g of a height similar to the diameter of the wires A, B to be accommodated in the clip. The excess length of each wire will therefore rest on one such anvil, and when subsequently the side walls of the clip are folded-over in forming the joint, the adjacent end of the remaining length of side wall will form a guillotine knife edge 1h which will co-operate with the adjacent side of the anvil 1g to trim off the excess length of wire. Preferably a short length of the side wall of the metal clip, extending from the end which forms the guillotine edge 1h is severed from the bottom 1a and jogged inwardly of the channel as shown at 1i to produce a more effective cutting action. When the windows 1e of the clip bottom are close enough to the anvil, their co-operation with the complementary ridges 1f of the sidewalls may be sufficient to prevent the wire from sliding off the anvil towards the centre line of the channel instead of being cut off. In cases, however, in which this effect is found insufficient, such sliding movement may be prevented by turning back the free end of the anvil-forming strip portion, in order to provide an anvil having a lateral stop formed by a double-thickness end portion. Two such anvils are shown at 1j and 1k respectively in FIGS. 6 and 7.

It will be readily appreciated that when a metal clip of the form described is inserted into a length of insulating channel the end portions of the insulating channels 5, which are not shortened, as the metal channel is, by the deflection of anvil-forming strips, will overlie the trimmed ends of the wires and the cutting edges 1h and anvils 1g, 1j or 1k of the metal clip, thus preventing accidental conductive contact with any part of the metal of the clip or wires.

While the provision of the windows 1e and ridges 1f minimises the detrimental effect of spring-back of the sidewalls of a channel-type metal clip upon the effectiveness of the joint the invention also contemplates methods of reducing the amount of spring-back itself to a minimum. In order to achieve this, the flanges 1b of the metal clip 1 are preferably subjected, during the bending-over of the channel flanges to form the joint, to a force tending to compress the bend and sufficiently large to at least approach the limit of resilient deformability of the material in the bend. When the stresses required for the bending-over are superimposed upon this compressive stress, substantially the whole of the cross-section of the material in the area of the bend is subjected to a compressive stress exceeding the limits of elastic deformability. This substantially avoids the resilient partial return movement which takes place when bending-over is effected in the hitherto usual way, because in this usual operation, although the fibres at both surfaces of the bend are subject to compression or elongation well above the limit of elasticity, the deformation of the fibres varies continuously across the thickness of the metal from a positive maximum to a negative maximum, passing through zero (in a so-called neutral zone) so that the usual operation involves deformations within the elastic limit over an appreciable portion of the cross-section, this resilient deformation of part of the metal being responsible for the hitherto experienced partial return movement of the bent-over flange when the bending tool is removed.

The described compression feature ensures that the limit of elasticity is exceeded substantially throughout the metal cross-section in the zone of bending, so that this cause of resilient spring-back is largely avoided.

FIG. 8 illustrates a tool suitable for performing the bending-over operation in accordance with this last-mentioned compression feature. The figure is an end view showing a clip similar to that shown in FIG. 5 inserted in a folding-over tool. The tool comprises an upwardly facing flat-ended punch 27 which slides between the two side members 28 which jointly form the folding die. A clip comprising a metal channel 1 in an insulating channel 5, is placed on the punch 27 with the outer side of the channel resting on the punch, and with the flanges in contact with the flat inside surfaces of the two side members 28 respectively, which form parallel guides for the initial part of the punch movement. When the wires A, B have been inserted into the clip, the punch 27 is moved upwards in the direction of the arrow X, and it will be observed that the upper ends of the two die side members 28 are deflected towards each other, thus forming a die whose end or roof is substantially flat in its central portion 29, and this flat portion is joined with a curved portion 30 to the flat inner surfaces of the die side members 28 in the lower part of the path of the punch. The curved portions 30 are so shaped that when struck by the upstanding flanges of a clip, they exert upon these flanges a downward force sufficient to produce permanent compression of the junction between these flanges and the web before the lateral force due to the gradient of the curved portion is sufficient to move the ends of the flanges towards each other, so that the normal bending stresses are superimposed on a high compressive stress.

FIG. 9 is a cross section of a completed joint, which due to the heavy compresion exerted within the bend zones 12, will show practically no tendency of springing back, so that the clip after the bending will retain a substantially flat top.

It should be appreciated that the provision of the windows 1e in the bottom of the channel and the complementary ridges of the side walls may be employed independently of the means for effecting automatic trimming of the wires, and that if the insulation-piercing elements are provided in the inner side of the side walls, the window 1e of the bottom would be replaced by corresponding ridges, while the complementary portions of the side walls would in this case be formed as depressions.

The method of bending-over the flanges of the jointing clip and the tools proposed for this purpose are clearly capable of general application to crimped connections employing channel-type jointing clips.

What I claim is:

1. A flexible strip of channel-type insulated jointing clips, which comprises a continuous channel of flexible insulating material whose two flanges are provided at their free edges with inwardly projecting clip-retaining portions, and in which a plurality of individual metal jointing clips are secured so as to be spaced from each other in the longitudinal direction of the channel, two of the channel walls being divided at a point intermediate each pair of adjacent ends of consecutive metal clips so as to ensure the formation, between such ends, of a flexible connection constituted by a flat continuous channel wall, the insulating channel embracing the profile of the channel-type metal clip substantially without play with the clip-retaining portions of the insulating channel retaining the metal clip at the bottom of the insulating channel.

2. A flexible strip of jointing clips as claimed in claim 1, wherein each metal jointing clip is provided with insulation-piercing edge portions for engaging the core of unstripped insulated wire.

3. A strip as claimed in claim 1, wherein the length of insulating channel attached to each insulated clip after sub-division of the channel is slightly in excess of that of the metal clip, and the latter is so placed in the associated section of the insulating channel that the two ends of the metal clip are spaced respectively from the two ends of the insulating channel section, each metal clip being secured against longitudinal displacement relative to its associated section of the insulating channel by portions of the latter stagged into apertures or recesses of the metal clip.

4. A strip as claimed in claim 1 in combination with a cassette in which the strip is accommodated in the form of a helical coil.

5. A flexible strip of channel-type insulated jointing clips, which comprises a continuous channel of flexible insulating material in which a plurality of individual metal jointing clips are secured so as to be spaced from each other in a longitudinal direction of the channel, two of the walls of the continuous channel being divided at a point intermediate each pair of adjacent ends of consecutive metal clips so as to ensure the formation, between such ends, of a flexible connection constituted by a flat continuous insulating channel wall, each section of the insulating channel, and the metal clip associated with each such section, being provided in its web portion with a locating hole, the locating holes of the channel and of its associated metal clip being in mutual alignment correctly longitudinally positioning the metal clip relative to the insulating channel.

6. A method of making a strip of channel-type insulated jointing clips, which comprises the steps of providing a supply of channel-type metal jointing clips each having a recess in one wall and a locating hole in its bottom wall, and a supply of extruded insulated channelling having walls respectively constituting a web and two flanges, said channelling being equipped with clip-retaining portions projecting inwardly from each of the flanges; providing such channelling with spaced locating holes in its web portion and with incisions sub-dividing each of the flanges, said incisions being perpendicular to the plane of the web and to the longitudinal direction of the channelling, and the spacing, in the longitudinal direction of the channelling, the spacing of said holes and the spacing of said incisions corresponding to the desired length of the insulation of each clip; loading each length of this flexible channelling with such metal clip by inserting the metal clip between the two flanges of the channelling in a direction at right angles to the web with the locating hole of the clip maintained in alignment with a locating hole in the web portion of the channelling until the two flanges resiliently return to their original position thus causing the clip-retaining portions of the insulating channelling to trap the metal clip against withdrawal in a direction opposite to that of their insertion; and stagging part of the material of a channel wall into said recess of each metal clip to secure the metal clip against longitudinal displacement along the channelling.

7. A channel of flexible insulating material having inwardly projecting secondary flanges at the outer edges of its flanges, two walls of the channel being sub-divided longitudinally into individual sections, each length of channel corresponding to such section having a location hole at a predetermined portion of its web.

8. A flexible strip of channel-type insulated jointing clips which comprises a continuous channel of flexible insulating material in which a plurality of individual metal jointing clips each having a bottom wall and two side walls are secured so as to be spaced from each other in the longitudinal direction of the channel, two of the channel walls being divided at a point intermediate each pair of adjacent ends of consecutive metal clips so as to ensure the formation between each end of a flexible connection constituted by a flat continuous channel wall of insulating material, each metal clip being formed at each end of its bottom wall with a raised anvil forming a cutting edge proud of the inside of said bottom wall, the anvils at the two ends of the metal clip being arranged at opposite sides of the longitudinal centre line of the channel-type metal clip, and the respectively adjacent side wall of the metal clip being shortened at its adjacent end to form a complementary cutting edge co-operating with said cutting edge of the anvil to trim off the end of a wire resting on said anvil when the side wall is folded down.

9. A strip as claimed in claim 8, wherein the surface of the anvil is provided with a shoulder facing one sidewall of the channel and opposing sliding movement of a wire towards the other side wall of the channel.

10. A strip as claimed in claim 8, wherein each anvil is constituted by a bent-over strip of a channel sidewall extending from the edge of the channel web.

11. A strip as claimed in claim 10, wherein the free end of said strip is doubled back to provide a stepped anvil opposing sliding movement of a wire towards the other sidewall of the channel.

12. A strip as claimed in claim 8, wherein the channel web of each clip is provided with a window having two edges extending transversely of the channel, and each channel sidewall is provided with a ridge portion at the inner side of the wall which, when the wall is folded over the web, projects into this window.

References Cited

UNITED STATES PATENTS 3,048,650   8/1962   Allen et al. _____ 174—90

OTHER REFERENCES

German App. No. 1,100,130, Feb. 23, 1961, Weiland.

DARRELL L. CLAY, Primary Examiner

U.S. Cl. X.R.

29—628; 174—84; 339—97, 276